W. L. MILLER.
ATTACHMENT FOR PREVENTING BACK KICKING OF AUTOMOBILES.
APPLICATION FILED DEC. 27, 1915.
1,196,379.                                Patented Aug. 29, 1916.
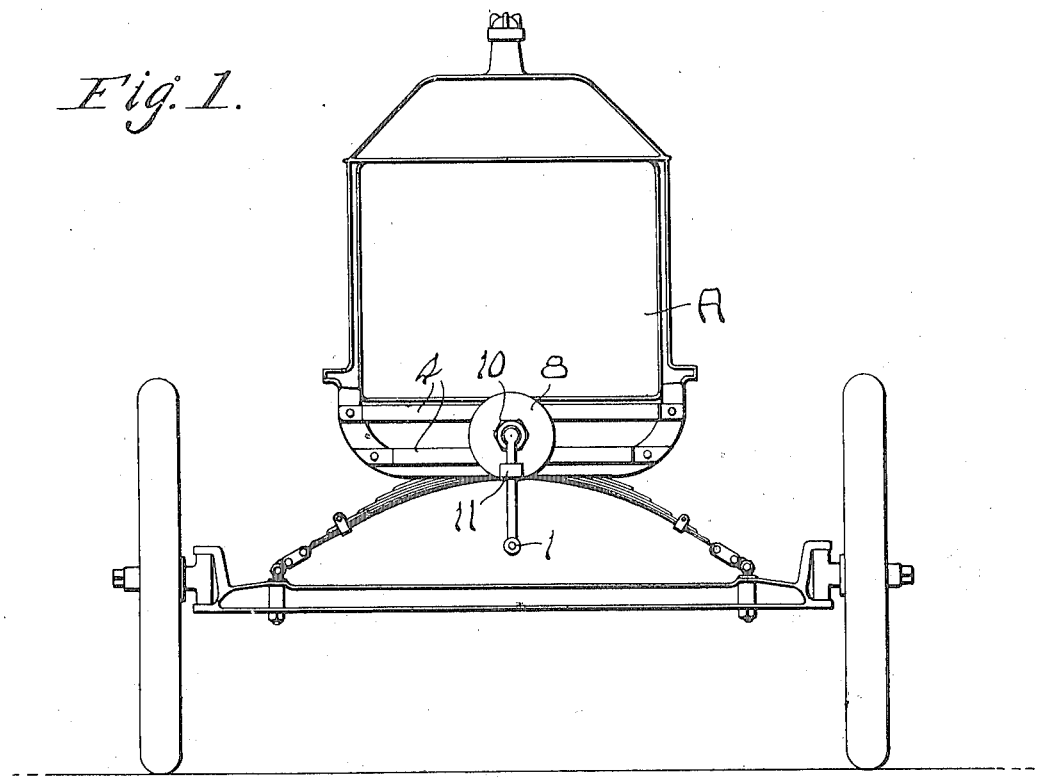
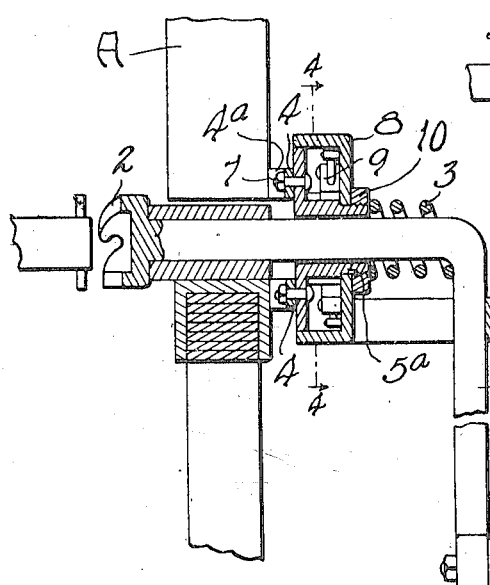
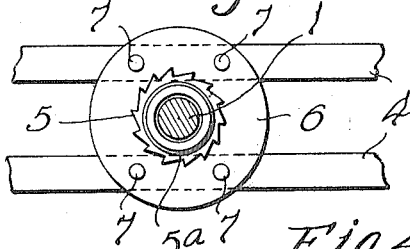
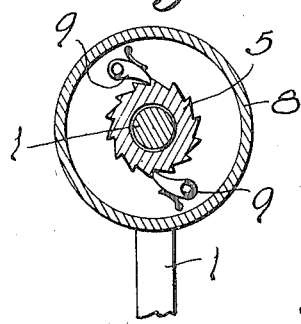
Inventor
W. L. MILLER
By H. S. Hill
Attorney

UNITED STATES PATENT OFFICE.

WILLIAM L. MILLER, OF LYONS, NEBRASKA.

ATTACHMENT FOR PREVENTING BACK-KICKING OF AUTOMOBILES.

1,196,379.  Specification of Letters Patent.  Patented Aug. 29, 1916.

Application filed December 27, 1915. Serial No. 68,806.

*To all whom it may concern:*

Be it known that I, WILLIAM L. MILLER, a citizen of the United States, residing at Lyons, in the county of Burt, State of Nebraska, have invented a new and useful Attachment for Preventing Back-Kicking of Automobiles; and I do hereby declare the following to be a full, clear, and exact description of the invention, such as will enable others skilled in the art to which it appertains to make and use the same.

The present invention relates to a device for preventing back firing of internal combustion engines when cranking the same, and has for its object to provide a device of this character which embodies novel features of construction whereby it can be readily mounted as an attachment upon any motor vehicle.

Further objects of the invention are to provide a device for preventing back firing of automobile engines which is simple and inexpensive in its construction, which will not interfere with the cranking of the engine in the usual manner, and which will eliminate the possibility of an accident due to the back firing of the engine when cranking the same.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a front elevation of an automobile showing an attachment for preventing back firing of the engine applied thereto. Fig. 2 is a detail transverse sectional view through the attachment. Fig. 3 is a front elevation of the ratchet wheel and supporting bars with the annular casing removed. Fig. 4 is a vertical sectional view taken on the line 4—4 of Fig. 2, looking in the direction of the arrows.

Corresponding and like parts are referred to in the following description and indicated in all the views of the drawing by the same reference characters.

Referring to the drawings, the reference character A designates in a fragmentary manner the forward end of a motor vehicle, the usual crank 1 being provided for turning over the engine when starting the same. This crank has the usual clutch connection 2 with the engine shaft, being slidably mounted so that it can be moved into and out of operative engagement with the engine shaft, and a spring 3 being provided for normally holding the crank in inoperative position.

Extending transversely across the front of the motor vehicle A are a pair of supporting bars 4 having the extremities thereof bent rearwardly to provide the brackets 4ª which are bolted or otherwise rigidly secured to the frame of the vehicle. One of these supporting bars 4 is arranged above the shaft of the crank 1, and the other supporting bar below the shaft of the said crank, a ratchet wheel 5 being fitted loosely upon the said shaft and rigidly secured to the bars 4. In the present instance this ratchet wheel 5 is shown as provided at the base thereof with a plate 6 which extends beyond the toothed periphery of the ratchet wheel and is secured by means of the bolts 7 to the supporting bars 4.

An annular casing 8 which is carried by the crank handle 1 fits over and incloses the ratchet wheel 5, being provided with spring actuated pawls 9 which engage the teeth of the ratchet wheel and slip freely over the same when the crank handle is turned in a proper direction to start the engine, although they coöperate with the teeth of the ratchet wheel to prevent backward rotation of the handle. The edges of the annular casing 8 may bear loosely against the plate 6 so that the casing and plate coöperate with each other to provide a housing inclosing the ratchet mechanism and excluding dirt and rain therefrom.

A slight hub 5ª may project from the ratchet wheel 5 to provide a bearing for the annular casing 8, a nut 10 being shown as applied to the projecting end of the hub to retain the casing in operative position. A looped keeper 11 projects outwardly from the front of the annular casing 8 and loosely receives the crank portion of the crank handle 1, said keeper being of sufficient length to admit of the crank handle being pushed inwardly to produce an operative connection with the engine shaft, and to be forced outwardly by the spring 3 to break the said operative connection with the engine shaft as soon as the crank handle is released. The annular casing is thus operatively connected with the crank 1 so as to rotate therewith, although the crank is free to move in and out independently of the annular casing. The pawls 9 move freely over the ratchet wheel 5 when the crank handle 1 is turned in the proper direction to start the engine, although they coöperate with the teeth of the ratchet wheel to prevent any possible turning of the crank handle 1 in the opposite direction. The possibility of an accident due to back firing of the engine while cranking the same is thus entirely eliminated.

Having thus described the invention, what I claim as new and desire to secure by Letters Patent, is:—

1. In a device of the character described, the combination of a crank formed with a shaft which is slidable longitudinally within its bearings, a rigidly mounted ratchet wheel surrounding the shaft of the crank, an annular casing surrounding the ratchet wheel and rotatably mounted thereon, a spring pawl mounted upon the annular casing and engaging the teeth of the ratchet wheel to prevent rotation of the casing in one direction, and a keeper projecting from the casing and loosely receiving the crank to lock the casing with the crank and permit the crank to move in and out independently of the casing.

2. In a device of the character described, the combination of a crank formed with a shaft which is slidable longitudinally within its bearings, a rigidly mounted ratchet wheel surrounding the shaft of the crank, said ratchet wheel being formed with a hub portion, a casing pivotally mounted upon the hub portion of the ratchet wheel and surrounding the ratchet wheel, a spring mounted pawl carried by the casing and engaging the teeth of the ratchet wheel to prevent rotation of the casing in one direction, and a keeper projecting from the casing and loosely receiving the crank so that the casing is rotatable with the crank although the crank can be moved in and out independently thereof.

3. In a device of the character described, the combination of a crank formed with a shaft movable longitudinally within its bearing, a pair of rigid supporting bars, a ratchet wheel rigidly secured to the supporting bars and surrounding the shaft of the crank, an annular casing rotatably mounted upon the ratchet wheel and surrounding the latter, a spring pawl upon the annular casing for engagement with the teeth of the ratchet wheel to prevent rotation in one direction of the casing, and a looped keeper projecting from the casing and loosely receiving the crank whereby the annular casing is locked to rotate with the crank although the crank can be moved in and out independently thereof.

4. In a device of the character described, the combination of a crank formed with a shaft which is slidable longitudinally within its bearings, a rigidly mounted ratchet wheel surrounding the shaft of the crank, an annular casing surrounding the ratchet wheel, a yieldably mounted pawl carried by the annular casing and coöperating with the teeth of the ratchet wheel to prevent rotation of the casing in one direction, and an operative connection between the annular casing and the crank for locking the annular casing to rotate with the crank, although the crank can be moved in and out independently of the casing.

In testimony whereof I have signed my name to this specification in the presence of two subscribing witnesses.

WILLIAM L. MILLER.

Witnesses:
  HENRY W. MILLER,
  D. E. LYON.